(12) United States Patent
Barr et al.

(10) Patent No.: US 7,613,961 B2
(45) Date of Patent: Nov. 3, 2009

(54) CPU REGISTER DIAGNOSTIC TESTING

(75) Inventors: Andrew Harvey Barr, Roseville, CA (US); Ken Gary Pomaranski, Roseville, CA (US); Dale John Shidla, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1115 days.

(21) Appl. No.: 10/685,177

(22) Filed: Oct. 14, 2003

(65) Prior Publication Data
US 2005/0080594 A1    Apr. 14, 2005

(51) Int. Cl.
| G11C 29/00 | (2006.01) |
| G06F 11/00 | (2006.01) |
| G06F 13/00 | (2006.01) |
| G06F 13/28 | (2006.01) |
| G06F 7/38  | (2006.01) |
| G06F 9/44  | (2006.01) |
| G06F 17/50 | (2006.01) |
| G06F 11/30 | (2006.01) |
| G21C 17/00 | (2006.01) |
| G06G 7/62  | (2006.01) |

(52) U.S. Cl. .......................... 714/718; 714/10; 714/12; 714/9; 714/28; 714/30; 714/51; 714/48; 714/13; 714/11; 702/183; 711/147; 711/167; 712/244; 703/13; 710/317

(58) Field of Classification Search ..................... None
See application file for complete search history.

(56) References Cited

U.S. PATENT DOCUMENTS

| 5,202,975 | A |   | 4/1993 | Rasbold et al. |
| 5,412,671 | A |   | 5/1995 | Tsuchiya |
| 5,638,357 | A | * | 6/1997 | Glitho et al. ................. 370/250 |
| 5,819,088 | A |   | 10/1998 | Reinders |
| 5,828,886 | A | * | 10/1998 | Hayashi ....................... 717/159 |
| 5,835,776 | A |   | 11/1998 | Tirumalai et al. |
| 6,134,675 | A | * | 10/2000 | Raina ............................ 714/37 |
| 6,141,791 | A | * | 10/2000 | Takuma et al. .............. 717/125 |
| 6,408,377 | B2 |   | 6/2002 | Munson |
| 6,434,712 | B1 |   | 8/2002 | Urban et al. |
| 6,460,173 | B1 | * | 10/2002 | Schreiber ..................... 716/18 |
| 6,553,530 | B1 |   | 4/2003 | Kim |
| 6,625,688 | B1 | * | 9/2003 | Fruehling et al. ........... 711/109 |
| 6,640,313 | B1 | * | 10/2003 | Quach .......................... 714/10 |
| 6,880,153 | B1 | * | 4/2005 | Thompson et al. .......... 717/151 |
| 7,127,310 | B1 | * | 10/2006 | Barto et al. ................. 700/100 |
| 7,206,969 | B2 | * | 4/2007 | Shidla et al. ................ 714/30 |
| 2003/0140138 | A1 | * | 7/2003 | Dygon et al. ................ 709/224 |

* cited by examiner

*Primary Examiner*—Kevin L Ellis
*Assistant Examiner*—Guerrier Merant

(57) ABSTRACT

One embodiment disclosed relates to a method of compiling a program to be executed on a target central processing unit (CPU). The method includes opportunistically scheduling diagnostic testing of CPU registers. The method may include use of a predetermined level of aggressiveness for the scheduling of the register diagnostic testing. The scheduled diagnostic testing may include writing known data to a register, reading data from the register, and comparing the known data with the data that was read. If the comparison indicates a difference, then a jump may occur to a fault handler routine.

13 Claims, 8 Drawing Sheets

CPU REGISTER DIAGNOSTIC TESTING

BACKGROUND OF THE INVENTION

1. Field of the Invention

The present invention relates generally to computer systems. More particularly, the present invention relates to microprocessors and diagnostics.

2. Description of the Background Art

One conventional solution for providing fault tolerance in digital processing by central processing units (CPUs) involves a computer system with multiple CPUs. For example, the multiple CPUs may be operated in full lock-step to achieve a level of fault-tolerance in their computations. Such a solution is expensive in that it disadvantageously requires additional system hardware and support infrastructure.

Another conventional solution for providing fault tolerance in digital processing by CPUs involves the use of software verification. The software verification may be performed either by executing the program multiple times on the same computer or on different computers. However, this solution is expensive in that it disadvantageously requires a longer run-time or requires multiple computers.

The above-discussed conventional solutions are expensive in terms of cost and/or system performance. Hence, improvements in systems and methods for providing fault tolerant digital processing by CPUs are highly desirable.

SUMMARY

One embodiment of the invention pertains to a method of compiling a program to be executed on a target central processing unit (CPU). The method includes opportunistically scheduling diagnostic testing of CPU registers. The method may include use of a predetermined level of aggressiveness for the scheduling of the register diagnostic testing. The scheduled diagnostic testing may include writing known data to a register, reading data from the register, and comparing the known data with the data that was read. If the comparison indicates a difference, then a jump may occur to a fault handler routine.

DETAILED DESCRIPTION

As discussed above, it is desirable to improve fault tolerance in relation to data processing systems. The present invention relates to methods and apparatus for improving fault tolerance in by way of CPU register diagnostic testing.

As data processing systems become more complex and sophisticated, it is becoming even more critical to be able to detect and correct errors that may occur, including errors that may affect the numerous storage elements of such systems. Storage elements that could use such protection and correction include large memory banks, high speed cache memories, storage registers, auxiliary memory storage elements, in fact any device which holds instructions or data needs effective data protection and correction techniques in modern computing systems.

Registers for CPUs are one of the key storage elements in modern computer systems. Registers comprise storage units within the microprocessor core that are located very close to the execution unit for quick access to data therein. Registers may be used for different purposes. They may be used as accumulators, as index registers or as special data handlers. Partial word read and write capabilities, which necessitates segmentation of data words, are desirable, but this requires additional complexity in the design of general sets and makes error correction and detection even more difficult.

With increasing processor performance and execution units, an increasing number of registers are being built into microprocessors. In addition, one of the driving factors for increased CPU performance is decreasing the transistor size and voltage level. As more and more registers are put in microprocessors with smaller and smaller device sizes and lower voltage levels, the need for fault tolerant features in these registers in increased.

Prior fault tolerant schemes for registers are known which involved parity checking for error detection. The ability for parity checking to detect errors is limited by the number of bits allocated to parity checking and thus does not provide full error coverage. Hence, with parity checking, there exists a potential for errors to occur, not be detected, and propagate as "silent" (undetected) data corruption. In addition, when a parity error occurs, the system typically must complete a machine check and shut down. In other words, no recovery mechanism is typically available.

Another prior "solution" is to disregard the potential errors in the CPU in general, and specifically in the registers, with the assumption that other system level error sources were much more likely to generate errors. The inventors believe that such an assumption is no longer prudent, given that there are numerous fault tolerant techniques for many of the other elements of the system, and the rate of errors within the CPU will soon become, if not already, an error source that is too significant to ignore.

Figure 1:
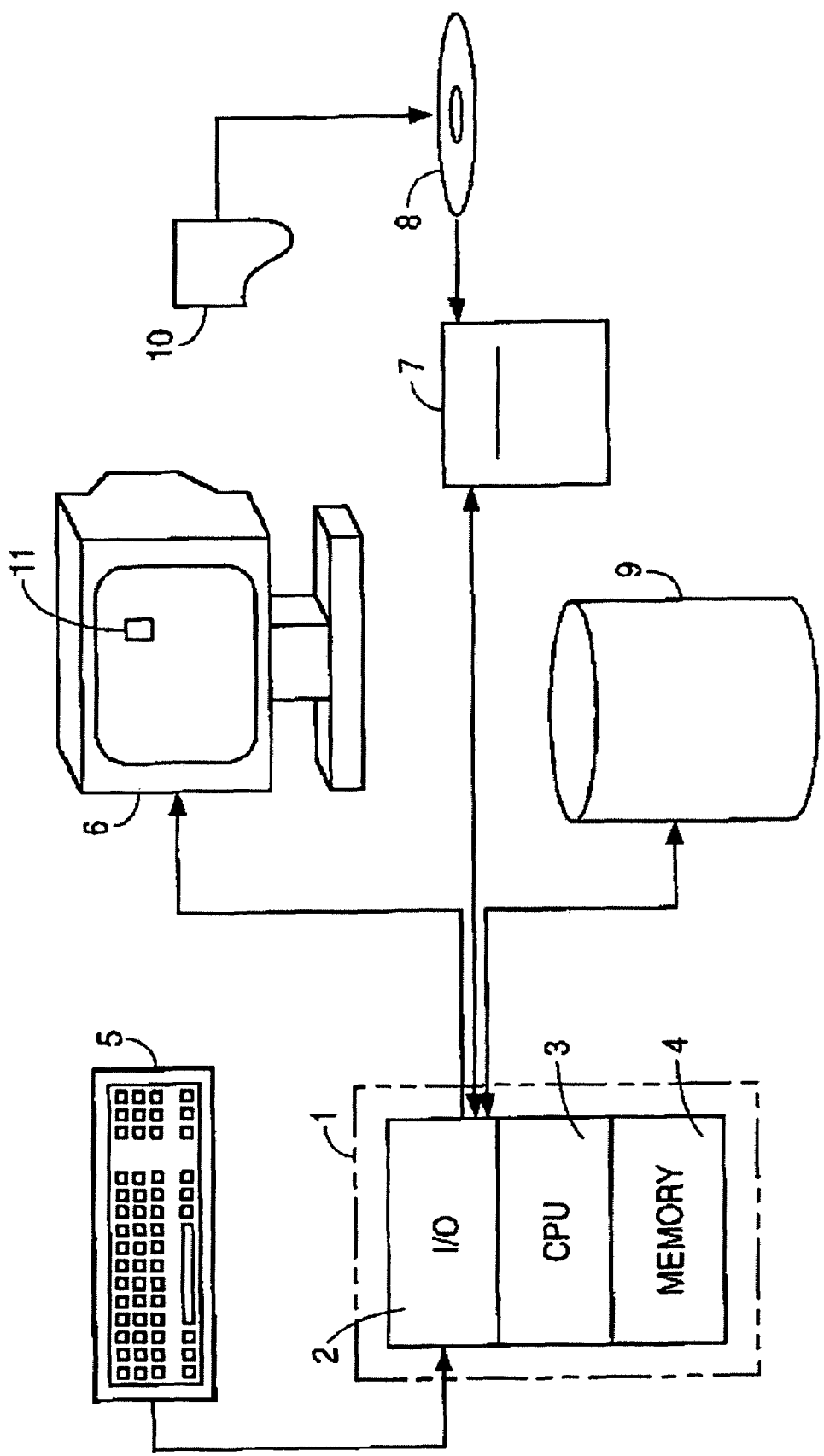
FIG. 1 illustrates a portion of a computer, including a CPU and conventional memory in which the presentation may be embodied.

The environment in which the present invention is used encompasses a general-purpose computer system, such as a server, a workstation or other computing system. Some of the elements of a general-purpose computer are shown in FIG. 1, wherein a computing system 1 is shown, having an Input/output ("I/O") section 2, a microprocessor or central processing unit ("CPU") 3, and a memory section 4. The I/O section 2 is connected to a keyboard and/or other input devices 5, a display unit and/or other output devices 6, one or more fixed storage units 9 and/or removable storage units 7. The removable storage unit 7 can read a data storage medium 8 which typically contains programs 10 and other data.

Figure 2:
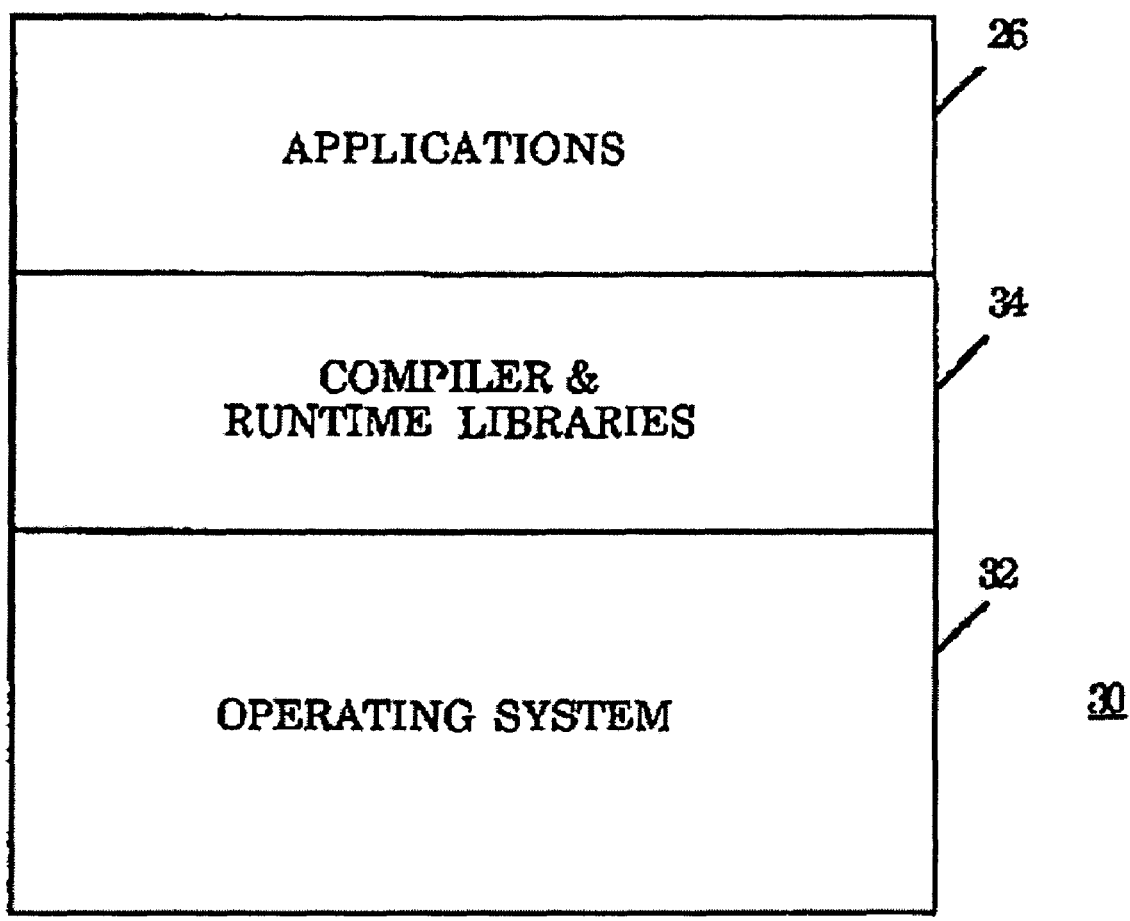
FIG. 2 illustrates example software elements of the illustrative computer system of FIG. 1.

FIG. 2 illustrates example software elements of the illustrative computer system of FIG. 1. Shown are application programs 26. Such applications 26 may be compiled using a compiler 34 incorporated with the teachings of the present invention. The compiled application programs 26 access the runtime libraries 34 for services during execution, which in turn access the operating system 32 for system services. The compiler 34 also accesses the operating system 32 for system services during compilation of application programs 26.

A compiler 34 incorporating the teachings of the present invention may comprise either a native compiler running on the target microprocessor system, or a cross compiler running on a different microprocessor system. In accordance with an embodiment of the invention, the target microprocessor for the compiler has multiple functional units of the same type. For example, the microprocessor may comprise one with a superscalar architecture.

Figure 3A:
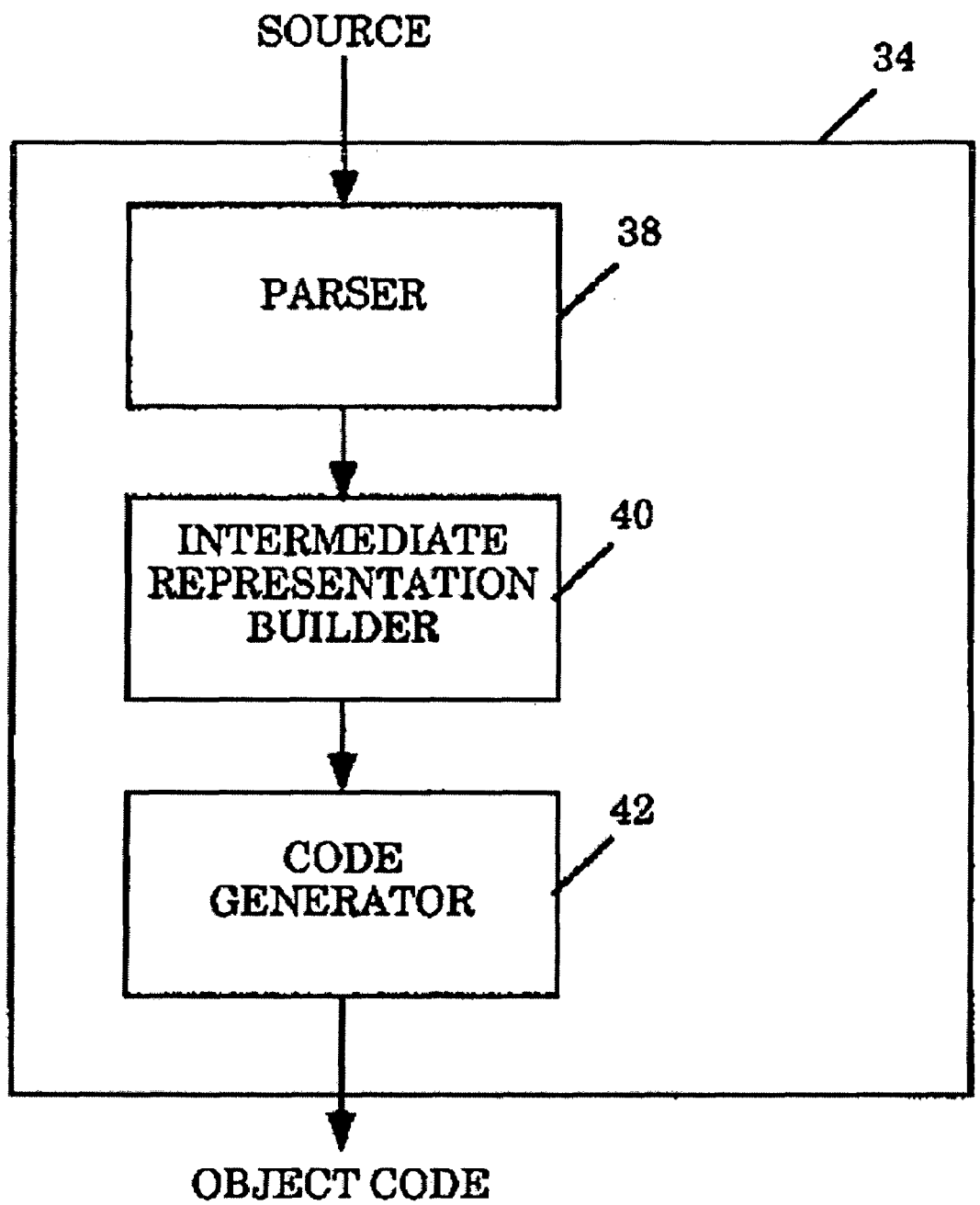
FIG. 3a is a block diagram illustrating components of a compiler in one example.
Figure 3B:
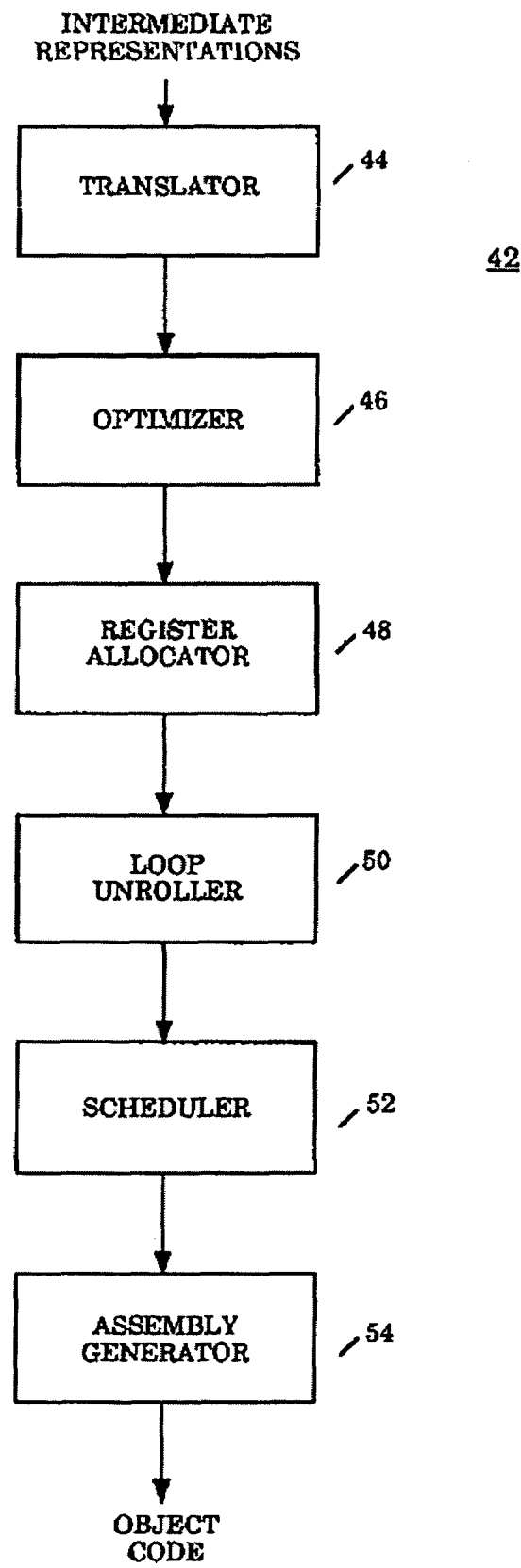
FIG. 3b is a block diagram illustrating components of a code generator in one example.

Referring now to FIGS. 3a and 3b, these block diagrams illustrate one embodiment of a compiler. As illustrated in FIG. 3a, in this embodiment, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. The compiler 34 may be configured differently in accordance with other embodiments.

As illustrated in FIG. 3b, in this embodiment, the code generator 42 is configured to include a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the target microprocessor to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the target microprocessor. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. The code generator 42 may be configured differently in accordance with other embodiments.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Figure 4:
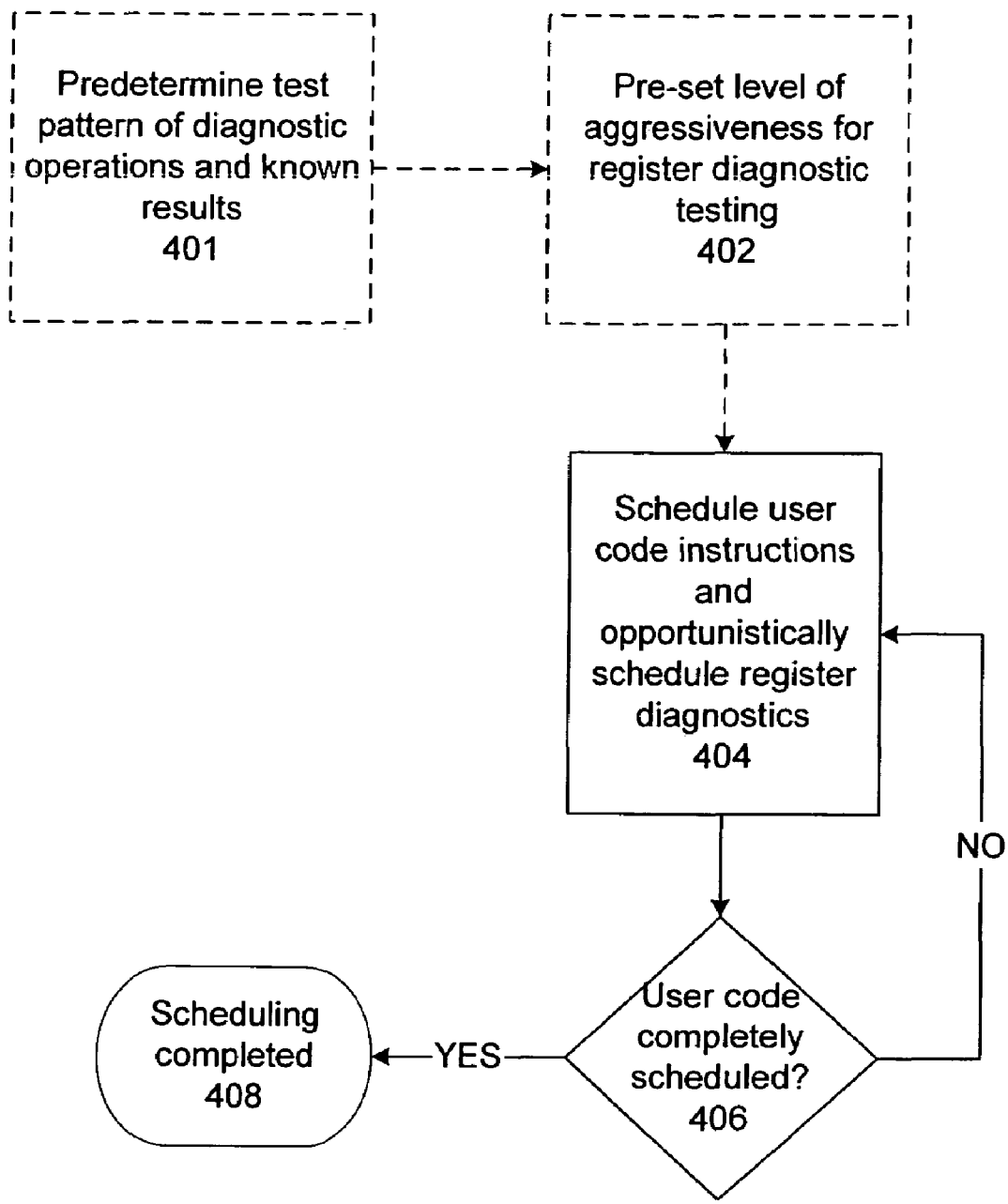
FIG. 4 is a high-level flow chart depicting a method of scheduling instructions in accordance with an embodiment of the invention.

FIG. 4 is a high-level flow chart depicting a method 400 of scheduling instructions in accordance with an embodiment of the invention. The method 400 may be, for example, performed using a compiler's code generator 42 as depicted in FIG. 3a.

Per the method 400 of FIG. 4, a preliminary step may involve predetermination 401 of a test pattern of diagnostic operations and associated known results. Pattern testing of the CPU registers may be used to help determine latent failures and data dependent weak cells. It is well known that there is an 'acceptable' latent defect rate for CPU chips that are shipped for customer use. This is because it is cost prohibitive to do full burn-in (past the left side of the well known 'bathtub curve') on every CPU chip. Preferably, the test pattern is chosen so as to provide an effective trial as to the proper functioning of every circuit element of the register being tested. Specific pattern testing of the registers may be used to determine failures at weak points more quickly. The test pattern may include, for example, a series of write and read instructions to the register being tested and comparing the read data with the expected result. For example, the test pattern may include writing and reading all one bits, all zero bitrs, and/or "checkerboard" data patterns (i.e. alternating ones and zeroes). The test pattern may also include "walking" a one or a zero bit through the register being tested. For a control register, the test pattern may comprise setting the register to a specific value and checking to see if the expected control functionality is performed.

The scheduling 404 performed by the method 400 may depend on a variable level of aggressiveness for the register diagnostic testing. This level of aggressiveness may be preset 402. In one embodiment, the level of aggressiveness may be implemented using one or more variable compiler flag(s). For example, a variable flag may specify a frequency of the testing. As another example, a variable flag may specify a maximum amount of performance overhead. By controllably varying the level of aggressiveness, a tradeoff can be made by the user between performance and fault tolerance. The desired level of aggressiveness may depend, for example, on the application being compiled and the specific intended use of that application. For applications that require high performance, a low amount of testing may be performed. For applications that require the most uptime or fault tolerance, a higher level of register testing may be scheduled (at the cost of some performance degradation). The applicants also envision writing a program filled with 'no-ops' with the aggressiveness set very high. After it is compiled, this program could be scheduled to run every so often to 'health check' the CPU registers. This would allow a relatively unsophisticated user to write a highly functional diagnostic program.

In accordance with an embodiment of the invention, the scheduling performed 404 includes both the scheduling of user code instructions and the opportunistic scheduling of register diagnostics. In other words, at compile time, the compiler schedules testing of registers so that the testing occurs within the normal running of the user code. The testing may be scheduled opportunistically and intelligently by the compiler to reduce the amount of performance overhead incurred. This scheduling is discussed further below in relation to FIG. 5. This scheduling is performed until a determination 406 is made that the user code is completely scheduled. Thereafter, the scheduling may be considered as completed 408.

Figure 5:
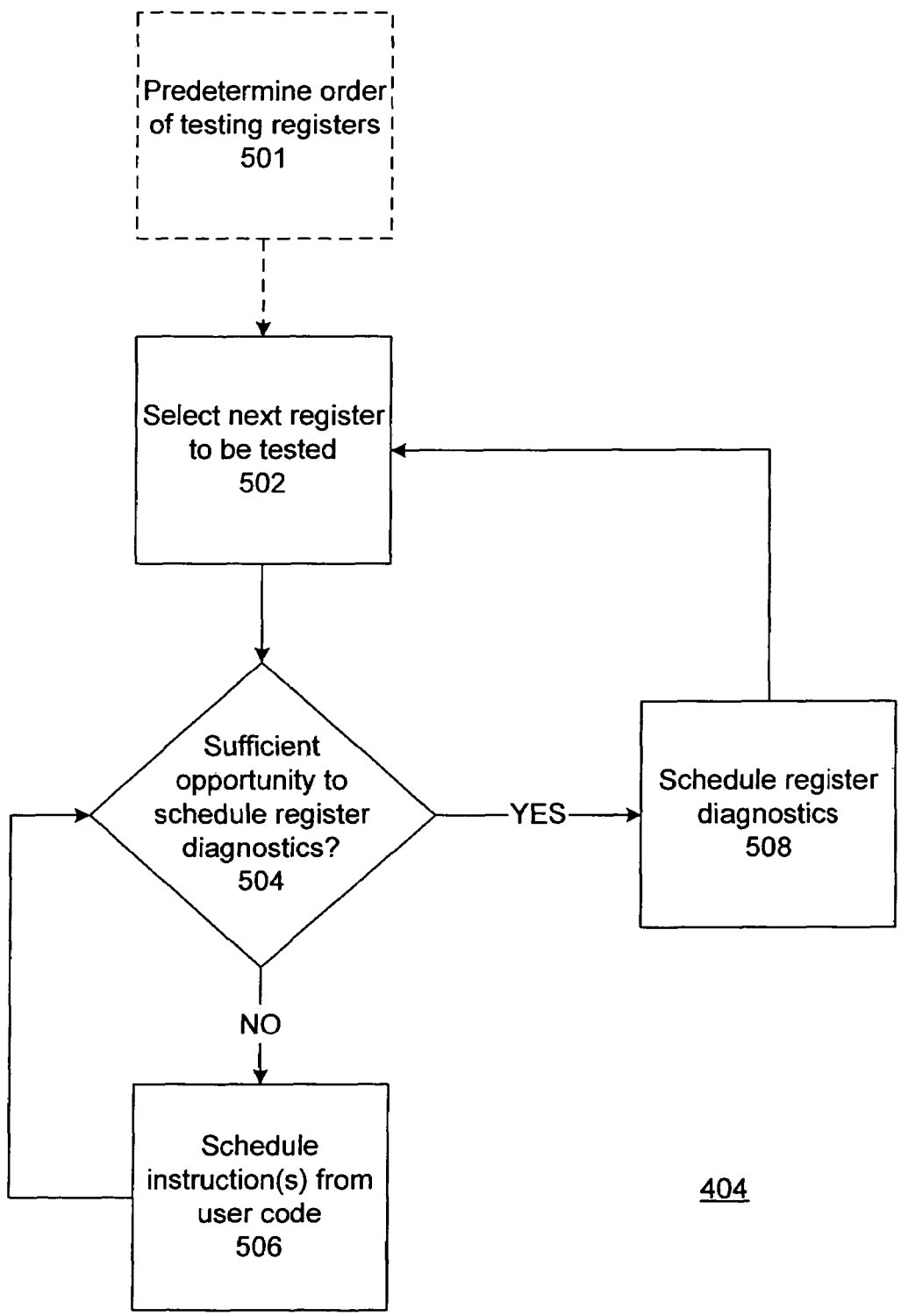
FIG. 5 is a flow chart depicting an example process wherein register diagnostic instructions are opportunistically scheduled in accordance with an embodiment of the invention.

FIG. 5 is a flow chart depicting an example process 404 wherein register diagnostic instructions are opportunistically scheduled in accordance with an embodiment of the invention. Note that the process 404 depicted in FIG. 5 is a simple process for explanatory purposes. An actual process as implemented may not have such a simple flow.

A preliminary step may be used to predetermine 501 the order in which the registers are tested. The order may be determined by a round robin or other algorithm so as to assure that all registers to be tested receive some level of testing.

Per the process 404 of FIG. 5, a next register to be tested may be selected 502. The selection may be made in accordance with the aforementioned testing order. A determination 504 may be made as to whether there is sufficient opportunity to schedule register diagnostics. If not, then instruction(s) from the user program being compiled are scheduled 506. This scheduling of instructions from the program being compiled is preferably performed knowing that register diagnostic testing will be performed. With such knowledge, the compiler can schedule register usage such that the opportunity is presented to schedule every register for some level of testing. When there is sufficient opportunity for diagnostic testing, then the register diagnostics is scheduled 508.

Figure 6:
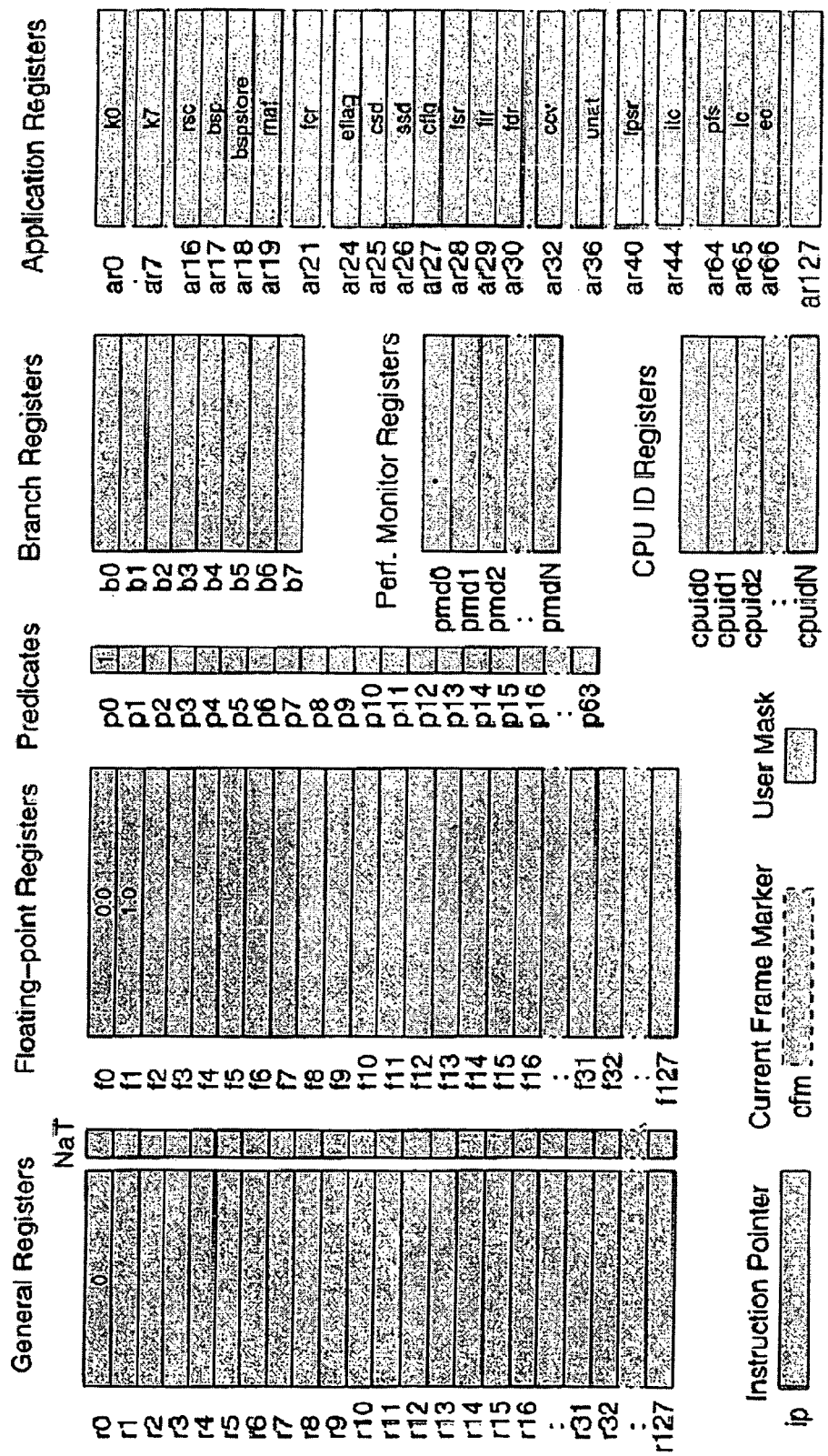
FIG. 6 is a schematic diagram depicting register files of an example 64-bit microprocessor.

FIG. 6 is a schematic diagram depicting register files of an example 64-bit microprocessor. The example microprocessor comprises an Intel microprocessor with an IA-64 architecture. The user-level register files depicted include a general register file, a floating point register file, a predicate register file, a branch register file, an application register file, and other registers. Of course, other microrprocessors with implement different register files.

The general register file may be, for example, partitioned into static and stacked registers. A register stack may comprise a number of general registers of a microprocessor, which have been designated for the storage of data required by, and pertaining to, procedures of a stored program being executed by the microprocessor. Specifically, upon execution of a particular procedure, a stack frame associated with that procedure is created within the register stack. The stack frame includes saved registers (containing variables local to relevant procedure), an activation record and a frame marker. When a procedure calls a further procedure, the called procedure in turn creates a further stacked frame on top of the stacked frame for the calling procedure. Accordingly, for a program in which a number of nested procedures are being executed, the register stack may include a corresponding number of stack frames. A register stack accordingly allows multiple procedures to effectively share a large register file by stacking associated stack frames in both on-chip registers and off-chip memory. The call/return patterns of typical programs exhibit high call/return frequencies with small amplitudes. A register stack significantly reduces the number of stores (i.e., register saves) at procedures calls, and reduces the number of loads (i.e., register restores) at procedure returns.

Figure 7:
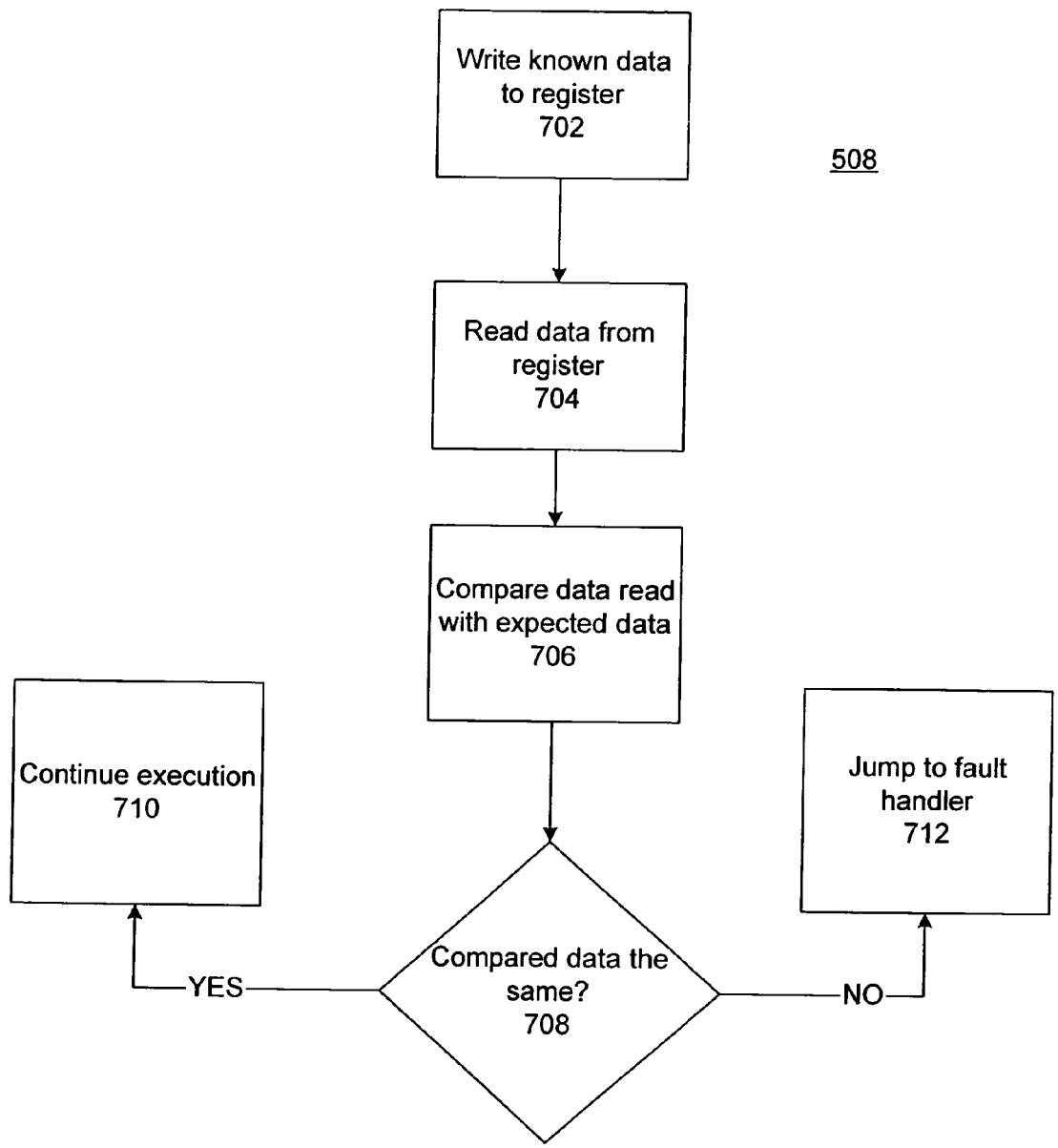
FIG. 7 is a flow chart depicting an example process for diagnostic testing of a register that may be scheduled in accordance with an embodiment of the invention.

FIG. 7 is a flow chart depicting an example process for diagnostic testing of a register that may be scheduled 508 in accordance with an embodiment of the invention. Note that the process 508 depicted in FIG. 7 is a simple process for explanatory purposes. An actual process as implemented may not have such a simple flow.

Per the process 508 of FIG. 7, known data may be written 702 to the register being tested. As discussed above, the known data may be part of a predetermined 401 test pattern. For instance, the known data may be a checkerboard pattern of zeros and ones. Subsequently, the data may be read 704 from the register being tested.

A comparison 706 may then be made between the data read and the expected data (i.e. the known data). A determination 708 may be made as to whether the compared data is the same. If it is the same, then no error is indicated, and the execution of instructions continues 710. If it is not the same, then an error in the register is indicated, and a jump 712 to a fault handler may occur.

The fault handler may be configured to take appropriate action. In accordance with one embodiment, the action includes halting the system before user data can be affected and potential data corruption can occur. In another embodiment, the action includes marking the register as no-use (such that it is not subsequently utilized) and remapping all activity to that register to an alternate register. The remapping may be performed with hardware circuitry added to CPU.

An embodiment of the present invention presents various advantages over what has been done before. First, latent errors or weak latches in registers can be found by the diagnostics before they affect user data and either cause silent data corruption or a machine check and system failure. Second, by using specific pattern testing, weak point may be quickly probed to determine failures more quickly. Third, the performance overhead incurred may be minimized as the register diagnostic testing may be opportunistically and intelligently scheduled by the compiler.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for testing a central processing unit (CPU) register, the method comprising:

scheduling user code instructions during a compiling of a software program to be executed on a target CPU; and opportunistically scheduling diagnostic testing of CPU registers during said compiling so that testing of the CPU registers occurs within normal running of the user code instructions during execution of the program after said compiling, wherein all of the CPU registers are scheduled for some level of diagnostic testing, the opportunistically scheduling diagnostic testing comprising:

checking a predetermined level of aggressiveness for the scheduling of a register diagnostic;

determining a next register to be tested;

determining if there is sufficient opportunity to schedule a register diagnostic instruction to test the next register without substantially impacting performance of the program, wherein if there is the sufficient opportunity, then scheduling the register diagnostic instruction to test the next register, and if there is insufficient opportunity to schedule the register diagnostic instruction, then scheduling the user code instructions; and if an error in a CPU register of the CPU registers is indicated, jumping to a fault handler routine.

2. The method of claim 1, wherein the CPU registers comprise registers in a general register file.

3. The method of claim 1, wherein the scheduled diagnostic testing includes writing known data to a register, reading data from the register, and comparing the known data with the data that was read.

4. The method of claim 3, wherein if the comparison indicates a difference, then said jump to the fault handler routine is performed.

5. The method of claim 4, wherein the fault handler routine is configured to halt execution to avoid potential data corruption.

6. The method of claim 4, wherein the fault handler routine is configured to remap activity to the register to an alternate register.

7. A method for testing central processing unit (CPU) registers, the method comprising:

opportunistically scheduling diagnostic testing of CPU registers, wherein all of the CPU registers are scheduled for some level of diagnostic testing, the opportunistically scheduling diagnostic testing comprising:

checking a predetermined level of aggressiveness for the scheduling of the register diagnostic testing;

determining a next register to be tested;

determining if there is sufficient opportunity to schedule a register diagnostic instruction to test the next register without substantially impacting performance of a program;

if there is sufficient opportunity, then scheduling the register diagnostic instruction to test the next register; and if there is insufficient opportunity, then scheduling user code instructions.

8. A computer-readable medium embedded with a compiler program for execution on a target microprocessor, the computer-readable medium comprising:

executable code configured for scheduling user code instructions; and executable code configured for opportunistically scheduling diagnostic testing of registers in the microprocessor so that testing of the registers occurs within normal running of the user code instructions and all of the CPU registers are scheduled for some level of diagnostic testing, wherein the executable code for opportunistically scheduling diagnostic testing comprises:

executable code for checking a predetermined level of aggressiveness for the scheduling of the register diagnostic testing;

executable code for determining a next register to be tested;

executable code for determining if there is sufficient opportunity to schedule a register diagnostic instruction to test the next register without substantially impacting performance of the compiler program;

executable code for scheduling the register diagnostic instruction to test the next register if there is sufficient opportunity; and executable code for scheduling user code instructions if there is insufficient opportunity to schedule the register diagnostic;

and executable code configured for jumping to a fault handler routine if an error in the register is indicated.

9. The computer-readable medium of claim 8, wherein the scheduled diagnostic testing includes writing known data to a register, reading data from the register, and comparing the known data with the data that was read.

10. The computer-readable medium of claim 9, wherein if the comparison indicates a difference, then said jump occurs to said fault handler routine.

11. The computer-readable medium of claim 10, wherein the fault handler routine is configured to halt execution to avoid potential data corruption.

12. The computer-readable medium of claim 10, wherein the fault handler routine is configured to remap activity to the register to an alternate register.

13. The computer-readable program product of claim 8, wherein the aggressiveness level is set at a high level, and wherein the diagnostic testing is scheduled to be performed periodically.

* * * * *

UNITED STATES PATENT AND TRADEMARK OFFICE
CERTIFICATE OF CORRECTION

| | | |
|---|---|---|
| PATENT NO. | : 7,613,961 B2 | Page 1 of 1 |
| APPLICATION NO. | : 10/685177 | |
| DATED | : November 3, 2009 | |
| INVENTOR(S) | : Andrew Harvey Barr et al. | |

It is certified that error appears in the above-identified patent and that said Letters Patent is hereby corrected as shown below:

In column 8, line 39, in Claim 13, delete "program product" and insert -- medium --, therefor.

Signed and Sealed this

Twenty-seventh Day of April, 2010

David J. Kappos
*Director of the United States Patent and Trademark Office*